(12) United States Patent
Nishi (10) Patent No.: US 8,231,116 B2
(45) Date of Patent: Jul. 31, 2012

(54) FLUID-FILLED TYPE VIBRATION DAMPING DEVICE AND METHOD OF MANUFACTURING THE SAME

(75) Inventor: Naoki Nishi, Nagoya (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 1163 days.

(21) Appl. No.: 12/073,340

(22) Filed: Mar. 4, 2008

(65) Prior Publication Data
US 2008/0237952 A1  Oct. 2, 2008

(30) Foreign Application Priority Data

Mar. 30, 2007  (JP) ................................. 2007-093182

(51) Int. Cl.
*F16F 13/16* (2006.01)
*B23P 13/00* (2006.01)

(52) U.S. Cl. .............. 267/140.13; 267/118; 267/140.11; 267/140.12; 267/140.3; 267/141.2; 267/219; 267/220; 267/273; 29/896.93

(58) Field of Classification Search ............. 267/140.13, 267/141.1–141.4
See application file for complete search history.

(56) References Cited

U.S. PATENT DOCUMENTS

| | | | |
|---|---|---|---|
| 5,356,121 A | 10/1994 | Ikeda | |
| 6,349,926 B1 | 2/2002 | Itoh | |
| 6,443,438 B2 | 9/2002 | Satori et al. | |
| 6,705,600 B2 * | 3/2004 | Yamaguchi et al. | 267/140.11 |
| 7,044,455 B2 | 5/2006 | Yoshida et al. | |
| 2002/0175456 A1 * | 11/2002 | Itoh | 267/140.11 |
| 2004/0100006 A1 * | 5/2004 | Kawahara | 267/118 |
| 2006/0091594 A1 * | 5/2006 | Miyahara | 267/140.13 |
| 2006/0113717 A1 * | 6/2006 | Sato et al. | 267/273 |
| 2006/0279031 A1 * | 12/2006 | Schleck et al. | 267/220 |

FOREIGN PATENT DOCUMENTS

| | | |
|---|---|---|
| JP | B2 8-6777 | 1/1996 |
| JP | A 2000-120761 | 4/2000 |

* cited by examiner

*Primary Examiner* — Robert A Siconolfi
*Assistant Examiner* — San Aung
(74) *Attorney, Agent, or Firm* — Oliff & Berridge, PLC (57) ABSTRACT

A fluid filled type vibration damping device wherein an outer tubular mounting member is externally fitted onto the collar sleeve at an externally fitted section formed by a tapered tube portion of the outer tubular mounting member, by means of a diameter reduction process. A mating projection projecting diametrically inward is formed on an inside peripheral face of the outer tubular mounting member, while a seal rubber layer having a thickness greater than a projecting height of the mating projection is formed covering the inside peripheral face of the outer tubular mounting member with the mating projection covered by the seal rubber layer. A location and projecting height of the mating projection are arranged so as to prevent an entry of another outer tubular mounting member into a large-diameter opening of the tapered tube portion during pre-treatment.

8 Claims, 7 Drawing Sheets

FLUID-FILLED TYPE VIBRATION DAMPING DEVICE AND METHOD OF MANUFACTURING THE SAME

INCORPORATED BY REFERENCE

The disclosure of Japanese Patent Application No. 2007-093182 filed on Mar. 30, 2007, including the specification, drawings and abstract is incorporated herein by reference in its entirety.

BACKGROUND OF THE INVENTION

1. Field of the Invention

The present invention relates to fluid filled type vibration damping devices adapted to exhibit vibration damping action on the basis of flow behavior of a non-compressible fluid which fills the interior. More specifically, the invention is concerned with a fluid filled type vibration damping device suitable for use as an automotive engine mount or the like, and a method of manufacturing the fluid filled type vibration damping device.

2. Description of the Related Art

Fluid filled type vibration damping devices that exhibit vibration damping action on the basis of flow behavior, such as the resonance effect, of a non-compressible fluid sealed in the interior are known in the prior art as vibration damping couplings or vibration damping supports designed to be installed between components making up a vibration transmission system.

One type of such fluid filled type vibration damping device disclosed in Patent Citation 1 (U.S. Pat. No. 7,044,455) has a first metallic mounting member anchored to the center section of a main rubber elastic body, and a second metallic mounting member of tubular shape secured fitting externally against the outside peripheral face of the main rubber elastic body. With a fluid-filled type vibration damping device of such a design, a fluid chamber can be formed by disposing the second mounting member so that it covers pocket portions which open onto the outside peripheral face of the main rubber elastic body.

In order to ensure the fluid-tightness of the fluid chamber formed by covering the openings of the pocket portions, the following arrangement has been typically employed. Namely, a fitting sleeve is bonded by vulcanization onto the outside peripheral face of the main rubber elastic body. A seal rubber layer is also bonded by vulcanization onto the inside peripheral face of the second mounting member. After fitting the second mounting member onto the outside of the fitting sleeve, the assembly is subjected to a diameter reduction process process to crimp the seal rubber layer between the fitting sleeve and the second mounting member.

Another favorable design for the second mounting member is one having a tapered tube shape with a taper angle, so that the second mounting member can be quickly fitted onto the outside of the fitting sleeve.

However, research conducted by the inventors has shown that where a second mounting member having this sort of tapered tube shape is employed, problems tend to occur during vulcanization molding of the seal rubber layer onto the inside peripheral face of the second mounting member.

Specifically, in order to execute vulcanization molding of the seal rubber layer onto the second mounting member, it is necessary by way of processes prior to vulcanization molding of the seal rubber layer, to subject the second mounting member by itself to pre-treatments such as a washing process, blasting process, and/or chemical film process (zinc phosphate plating process), for example. During this processes, with the goal of improving process efficiency, it is common practice to group together a number of second mounting members and carry out pre-treatment of them simultaneously. As a specific example, several dozen second mounting members may be placed together in a single basket; and transported through the treatments, immersed in treatment solutions, washed, and so on in basket units.

Where multiple second mounting members are handled by being placed in a single basket in this way, since the fittings have the tapered tube shape mentioned above, it is possible for the small-diameter end of a fitting to become lodged in the large-diameter opening of another second mounting member. Where two mounting members are lodged together in this way, it will not be possible for washing, film formation, or other such treatment to be carried out on their interlodged sections. An inherent problem is susceptibility in the untreated portions to bonding defects in the subsequent vulcanization-molded seal rubber layer.

In particular, it is difficult to assess the quality of pre-treatments performed on second mounting members simply through inspection with the naked eye subsequent to treatment.

Moreover, since multiple second mounting members are subjected to pre-treatments while placed in a single basket, fittings that were not lodged together prior to treatment may become lodged together during treatment; and second mounting members that were lodged together during treatment may come apart after treatment. Therefore, simply ascertaining before and after treatment whether any the second mounting members are lodged together will not be likely to give sufficient reliability and certainty.

SUMMARY OF THE INVENTION

It is an object of the present invention to provide a fluid filled type vibration damping device of novel construction whereby a high degree of reliability in pre-treatment of the outer tubular fitting, and hence in forming of the seal rubber layer covering the outer tubular fitting, may be assured. It is another object of the present invention to provide a novel method of manufacturing the fluid filled type vibration damping device.

The above and/or optional objects of this invention may be attained according to at least one of the following modes of the invention. The following modes and/or elements employed in each mode of the invention may be adopted at any possible optional combinations.

One aspect of the present invention provides a fluid filled type vibration damping device comprising: an inner mounting member fixable to one of components to be linked in vibration damping fashion; a main rubber elastic body bonded to the inner mounting member; a collar sleeve bonded onto an outside peripheral face of the main rubber elastic body; an outer tubular mounting member attached to another of the components to be linked in vibration damping fashion, the outer tubular mounting member being externally fitted onto the collar sleeve so that an opening of a pocket portion provided to the main rubber elastic body is fluid-tightly covered by the outer tubular mounting member so as to form a fluid chamber filled with a non-compressible fluid; and a seal rubber layer disposed at a section where the outer tubular mounting member and the collar sleeve are fastened together; wherein an externally fitted section of the outer tubular mounting member to the collar sleeve is formed by a tapered tube portion of the outer tubular mounting member, the tapered tube portion being fitted externally from a large-diameter opening thereof onto the collar sleeve and fastened thereto by means of diameter reduction process; a mating projection which projects diametrically inward is formed on an inside peripheral face of the outer tubular mounting member, while the seal rubber layer having a thickness greater than a projecting height of the mating projection is formed covering the inside peripheral face of the outer tubular mounting member with the mating projection covered by the seal rubber layer, and within the tapered tube portion of the outer tubular mounting member before the seal rubber layer has been formed and before fastening onto the collar sleeve, a location and projecting height of the mating projection are arranged so as to prevent an entry of another outer tubular mounting member into the large-diameter opening of the tapered tube portion.

In the fluid filled type vibration damping device of structure according to the present invention, the mating projection which is formed so as to project diametrically inward on the inside peripheral face of the tapered tube portion will prevent another outer tubular mounting member from entering the large-diameter opening of the tapered tube portion, thereby improving process efficiency of pre-treatments. Thus, even where multiple outer tubular mounting members have been placed in single baskets and the outer tubular mounting members subjected simultaneously to pre-treatment in this state, it will be possible to carry out pre-treatments reliably on all of the multiple outer tubular mounting members which have been placed in a single basket.

More specifically, even if the small-diameter end of an outer tubular mounting member should become lodged in the large-diameter opening of another outer tubular mounting member, the small-diameter end of this outer tubular mounting member will bump against the mating projection which has been formed in proximity to the large-diameter opening, preventing it from becoming lodged further therein. Consequently, such lodging will not ultimately result in linear contact or planar contact about the entire circumference as can occur with conventional designs lacking the mating projection, and will instead be held to generally point contact by the presence of the mating projection. As a result, it is possible to substantially eliminate areas not exposed to pre-treatment due to being interlodged, eliminating the need for a procedure to check for such interlodging before and after treatment.

Accordingly, in the fluid filled type vibration damping device of the present invention, it is possible to advantageously avoid the problem of bonding defects in bonding of the seal rubber layer which is formed through vulcanization molding subsequent to pre-treatment. This makes it possible to carry out the pre-treatment of outer tubular mounting members, and forming of the seal rubber layer covering the outer tubular mounting member, with a high degree of reliability.

In one preferred form of the invention, since the seal rubber layer is thicker than the projecting height of the mating projection, when the seal rubber layer is formed covering the inside peripheral face of the outer tubular mounting member the mating projection will be covered by the seal rubber layer. Thus, the inside peripheral face of the outer tubular mounting member in a state covered by the seal rubber layer subsequent to pre-treatment of the outer tubular mounting member can have a smooth round tubular shape similar to one lacking a mating projection. It is thereby possible to avoid problems such as the mating projection becoming caught on the collar sleeve when the tapered tube portion of the outer tubular mounting member with the seal rubber layer formed thereon is externally fitted from the large-diameter end onto the collar sleeve.

In another preferred form of the invention, the outer tubular mounting member is formed by pressing, and the mating projection is formed by pressing on the tapered tube portion. It is possible thereby to advantageously manufacture an outer tubular mounting member having the mating projection disposed in its tapered tube portion, as well as projecting diametrically inward from the inside peripheral face of the tapered tube portion. In the present invention, it would also be possible to utilize an outer tubular mounting member fabricated by some other process, for example, winding and welding a strip of tabular shape.

In yet another preferred form of the invention, the at least one mating projection comprises a plurality of mating projections, and the mating projections are formed at locations opposed diametrically to each other on either side of a center axis of the outer tubular mounting member. This arrangement makes it possible to prevent another outer tubular mounting member from becoming lodged in the large-diameter opening of the tapered tube portion, effectively, despite a small number of mating projections. For instance, by situating a pair of mating projections in opposition in the diametrical direction, it is possible to effectively prevent outer tubular mounting members from becoming lodged in one another, while keeping the projecting height of any single mating projection to a minimum. It would be acceptable to form a single pair of mating projections, or multiple pairs. Where multiple pairs of mating projections are formed, the distance separating sets of two adjacent mating projections in the circumferential direction may be the same or different.

In yet another preferred form of the invention, the tapered tube portion comprises multiple tapered sections of different taper angles, and a section located at the large-diameter opening constitutes a large-taper section endowed with a greatest taper angle, while the mating projection is formed in the large-taper section. This arrangement makes it possible to advantageously prevent another outer tubular mounting member from becoming lodged in the large-diameter opening of the tapered tube portion, as well as to increase the range of selection of the location to form the mating projections in the axial direction of the outer tubular mounting member.

Specifically, where the tapered tube portion has the constant taper angle, in order to prevent another outer tubular mounting member from becoming lodged in the large-diameter opening of the tapered tube portion, it is necessary to situate the mating projections in the immediate vicinity of the open end on the large-diameter side of the tapered tube portion. However, where the tapered tube portion comprises multiple tapered sections of different taper angles as described above, and the section at the large-diameter opening thereof constitutes the large-taper section endowed with the greatest taper angle, it will be possible to form the mating projections at any location in the axial direction of the large-taper section. Thus, it will not be necessary to situate the mating projections in the immediate vicinity of the open end, thereby making it possible to select the location at which the mating projections will be formed. As a result, the mating projections can be formed at locations which avoid the externally fitted section of the outer tubular mounting member to the collar sleeve, making it possible to advantageously avoid problems such as diminished fluidtightness of the fluid chamber caused by the mating projections being situated in the externally fitted section of the outer tubular mounting member to the collar sleeve. Moreover, in the case where two fluid chambers are to be formed with the outer tubular mounting member securely fitted onto the collar sleeve, an orifice passage component for the purpose of forming an orifice passage interconnecting these two fluid chambers should be disposed as another component between the outside peripheral face of the collar sleeve and the inside peripheral face of the outer tubular mounting member. Namely, with the outer tubular mounting member securely fitted onto the collar sleeve, if another component is to be disposed between the outside peripheral face of the collar sleeve and the inside peripheral face of the outer tubular mounting member, it will be possible to form the mating projections at locations which avoid this component, and to advantageously avoid damage to the component during fastening of the outer tubular mounting member to the collar sleeve. In order to achieve this advantage, it will be preferable to form the mating projection at a location situated at the opening of the pocket portion in the outer tubular mounting member, and covering the pocket portion.

Where an arrangement such as the above is employed, it will be preferable for the mating projections to be situated at the small-diameter end of the large-taper section. By so doing it will be possible to minimize the projecting height of the mating projections and minimize the thickness dimension of the seal rubber layer. Herein, the "small-diameter end of the large-taper section where the mating projection is formed" should not be construed as limited exclusively to the end edge at the small-diameter side of the large-taper section in the outer tubular mounting member, but rather to include an area extending some distance away in the axial direction therefrom into "proximity to the end on the small-diameter side."

In yet another preferred form of the invention, the tapered tube portion of the outer tubular mounting member has a straight, round tubular shape once the outer tubular mounting securely fitted onto the collar sleeve. With this arrangement, in the event that the outer tubular mounting member will be attached through press-fitting into a tubular bracket so that the outer tubular mounting member can be mounted via the bracket onto the other component of the vibration-damped linkage, it will be possible to advantageous ensure press-fitting force of the outer tubular mounting member against the tubular bracket.

In yet another preferred form of the invention, there is employ an arrangement wherein the collar sleeve is disposed radially outward of the inner mounting member with a given distance disposed therebetween in an axis perpendicular direction, with the collar sleeve and the inner mounting member connected in the axis-perpendicular direction by the main rubber elastic body; wherein the at least one pocket portion comprises a pair of pocket portions situated in opposition in the axis-perpendicular direction and opening onto the outside peripheral face of the main rubber elastic body, while the collar sleeve has a pair of window portions located at either side of the inner mounting member in the axis-perpendicular direction so that pocket portions open onto the outside peripheral face through the respective window portions of the collar sleeve; and wherein the outer tubular mounting member is externally fitted onto the collar sleeve, and then is fastened onto the collar sleeve through a diameter reduction process so that the window portions of the collar sleeve are covered fluid tightly by the outer tubular mounting member, providing a pair of fluid chambers situated in opposition to either side of the inner mounting member in the axis-perpendicular direction.

Another aspect of the present invention provides a method of manufacturing a fluid filled type vibration damping device having a non-compressible fluid sealed therein, comprising the steps of: preparing a vibration damping device unit including an inner mounting member bonded to a center section of a main rubber elastic body, a collar sleeve bonded to an outside peripheral face of the main rubber elastic body, and at least one pocket portion which open onto an outside peripheral face of the collar sleeve; preparing an outer tubular mounting member so as to have an externally fitted section adapted to be fastened to the collar sleeve and having a tapered tube portion with a taper angle, and so as to have a mating projection which projects diametrically inward on an inside peripheral face of the outer tubular mounting member, the outer tubular mounting member being subjected to a pre-treatment for forming a seal rubber layer thereon, which is performed simultaneously on a plurality of outer tubular mounting members destined for respective installation in separate fluid filled type vibration damping devices such that the mating projection prevents a small-diameter end portion of an outer tubular mounting member from becoming lodged in a large-diameter opening of another outer tubular mounting member; coating an inside peripheral face of the outer tubular mounting member by the seal rubber layer of thickness greater than a projecting height of the mating projection so that the mating projection is covered by the seal rubber layer; externally assembling the outer tubular mounting member onto the vibration damping device unit such that the tapered tube portion of the outer tubular mounting member being assembled from a large-diameter end thereof onto the collar sleeve and subjected to a diameter reduction process to thereby being fastened onto the collar sleeve so that an opening of the pocket portion is covered by the outer tubular mounting member; and fluid-tightly sealing an interface between the outer tubular mounting member and the collar sleeve by the seal rubber layer which covers the inside peripheral face of the outer tubular mounting member.

According to this method of manufacturing a fluid filled type vibration damping device, even where pre-treatment for the purpose of forming the seal rubber layer which covers the outer tubular mounting member is carried out simultaneously on a plurality of outer tubular mounting members destined for respective installation in separate fluid filled type vibration damping devices, the mating projections which have been formed on the inside peripheral face of the outer tubular mounting member so as to project diametrically inward will prevent the small-diameter end of one outer tubular mounting member from becoming lodged in the large-diameter opening of another outer tubular mounting member. Thus, the pre-treatment can be carried out reliably on all of the plurality of outer tubular mounting members. As a result, a high degree of reliability in pre-treatment of the outer tubular fitting, and hence in formation of the seal rubber layer covering the outer tubular fitting, may be assured.

The seal rubber layer which covers the inside peripheral face of the outer tubular mounting member subsequent to pre-treatment is arranged to cover the mating projections which have been formed on the inside peripheral face of the outer tubular mounting member. This makes it possible to avoid the problem of the mating projections becoming caught on the collar sleeve when the outer tubular mounting member is externally assembled onto the collar sleeve.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
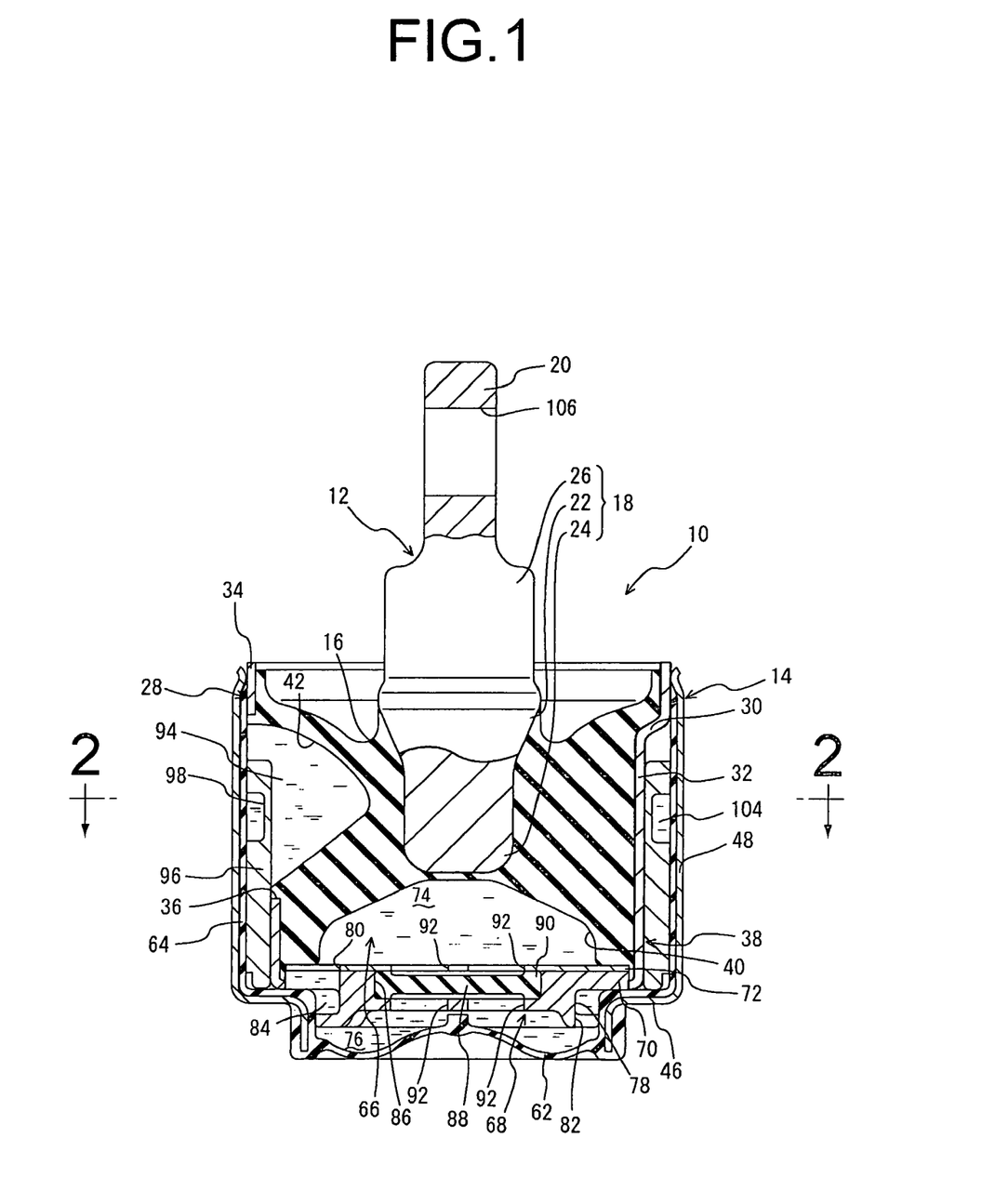
FIG. 1 is a vertical cross sectional view of a fluid filled type vibration damping device in the form of an engine mount of construction according to one embodiment of the present invention, taken along line 1-1 of FIG. 2.
Figure 2:
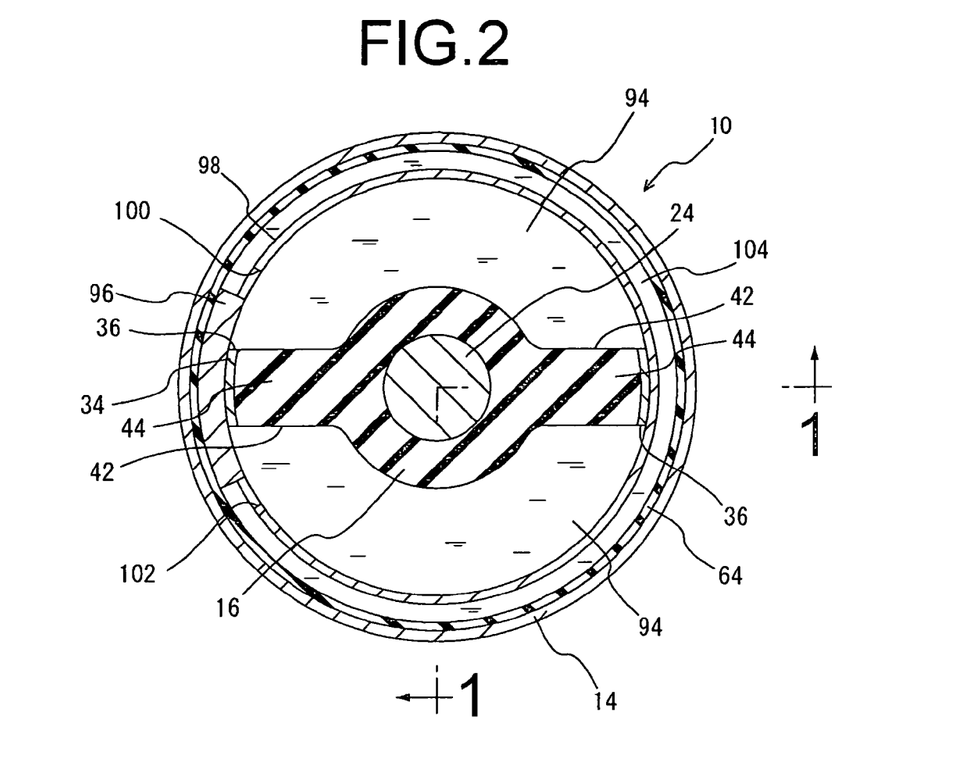
FIG. 2 is a cross sectional view taken along line 2-2 of FIG. 1.
Figure 3:
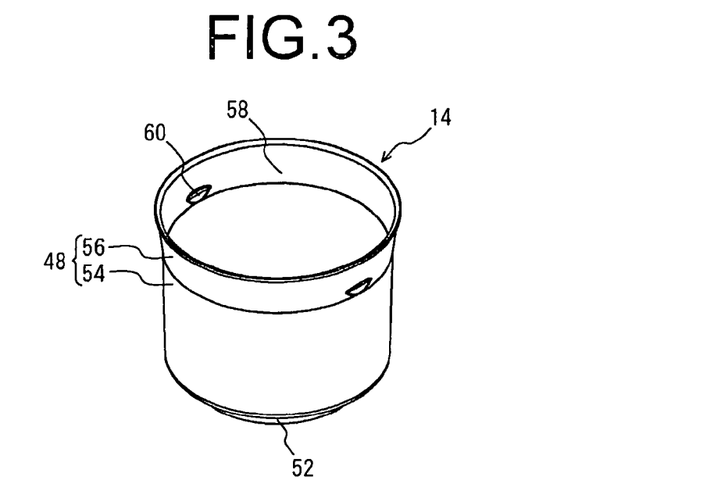
FIG. 3 is a perspective view of an outer tubular mounting member of the engine mount of FIG. 1.
Figure 4:
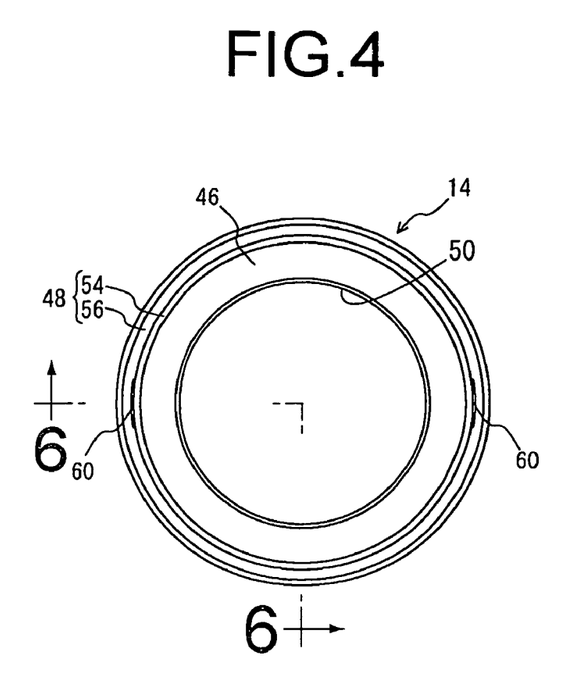
FIG. 4 is a top plane view of the outer tubular mounting member of FIG. 3.
Figure 5:
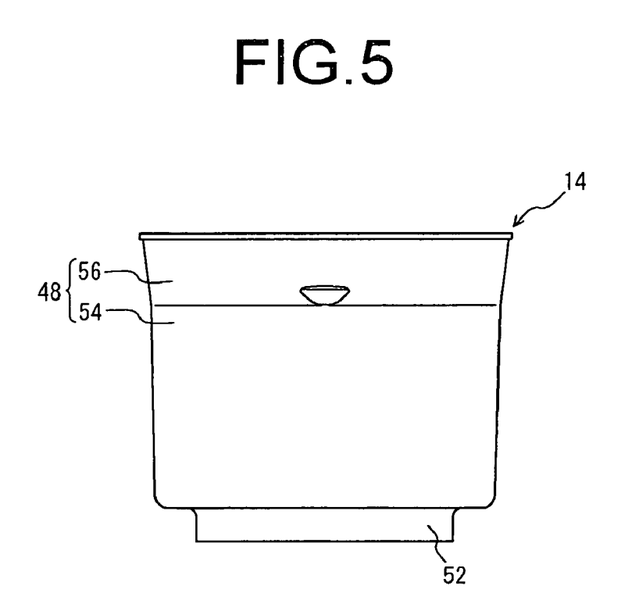
FIG. 5 is a side elevational view of the outer tubular mounting member of FIG. 3.
Figure 6:
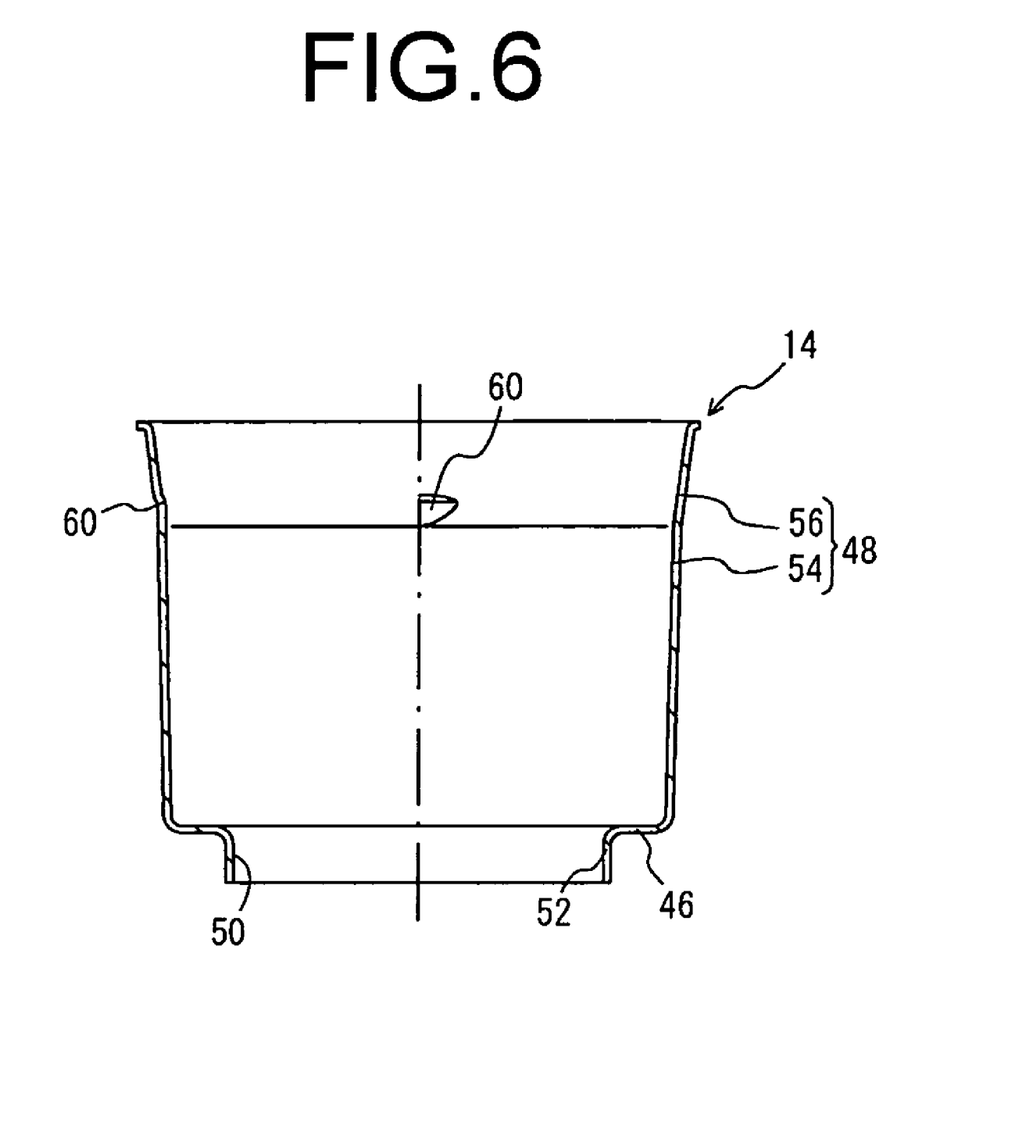
FIG. 6 is a cross sectional view taken along line 6-6 of FIG. 4.

FIGS. 1 and 2 depict an automotive engine mount 10 as a fluid filled type vibration damping device according to an embodiment of the present invention. This engine mount 10 has a structure in which a metallic inner shaft member 12 serving as an inner mounting member and a metallic outer tubular member 14 serving as an outer tubular mounting member are positioned spaced apart, and with the inner shaft member 12 and the outer tubular member 14 connected by a main rubber elastic body 16. The inner shaft member 12 is mounted onto the power unit of the automobile, while the outer tubular member 14 is mounted onto the automobile body, thereby providing vibration-damped support of the power unit on the body. The engine mount 10 of the embodiment is installed oriented with the vertical direction in FIG. 1 generally aligned with vertical. Herein, as a general rule the vertical direction refers to the vertical direction in FIG. 1.

More specifically described, the inner shaft member 12 includes a support shaft part 18 having a solid, small-diameter rod shape. A mounting fastener portion 20 is integrally formed at the axial upper end of the support shaft part 18 which extends in a straight line in the vertical direction. A tapered section 22 is provided in the axially medial section of the support shaft part 18. The section of the support shaft part 18 located axially below this tapered section 22 constitutes a small-diameter section 24, while the section of the support shaft part 18 located axially above constitutes a large-diameter section 26.

A metal sleeve 28 serving as a collar sleeve and having a thin-walled, large-diameter round tubular shape is disposed to the outside of the inner shaft member 12 and positioned generally coaxially therewith while spaced apart by a prescribed distance in the diametrical direction. In this metal sleeve 28 is formed a shoulder portion 30 which is situated at an upwardly eccentric location from the axial center; the section axially below this shoulder portion 30 constitutes a small-diameter section 32 and the section axially above constituting a large-diameter section 34. A pair of window portions 36, 36 are formed in the axially medial section of the metal sleeve 28, in sections located in opposition along an axis in the diametrical direction. In the present embodiment, the opening of each window portion 36 extends a length approximately equal to just less than one-half the circumference.

The inner shaft member 12 and the metal sleeve 28 having the structure described above are positioned with the inner shaft member 12 inserted into the metal sleeve 28 from its opening at the axial upper end. By positioning the inner shaft member 12 with respect to the metal sleeve 28 in this way, the metal sleeve 28 will be positioned encircling the entire small-diameter section 24 of the inner shaft member 12 while spaced apart from it in the diametrical direction. Also, with the inner shaft member 12 positioned with respect to the metal sleeve 28 in this way, the mounting fastener portion 20 of the inner shaft member 12 will be positioned projecting axially upward from the metal sleeve 28, while the axial lower end of the small-diameter section 24 will be positioned in the axially medial portion of the metal sleeve 28 and will not reach its axial lower end.

The main rubber elastic body 16 is disposed between the diametrically opposed faces of the inner shaft member 12 and the metal sleeve 28 which have been arranged in this positional relationship. The inner shaft member 12 and the metal sleeve 28 are elastically connected in the axis-perpendicular direction by the main rubber elastic body 16. This main rubber elastic body 16 has a circular block shape overall. The small-diameter section 24 and the tapered section 22 of the inner shaft member 12 are inserted into the main rubber elastic body 16 so as to extend along the center axis from the center of the upper end face of the main rubber elastic body 16. The small-diameter section 24 and the tapered section 22 are vulcanization bonded at their outside peripheral face to the main rubber elastic body 16. Additionally, the metal sleeve 28 is juxtaposed against and vulcanization bonded to the outside peripheral face of the main rubber elastic body 16. That is, in the present embodiment, the main rubber elastic body 16 takes the form of an integrally vulcanization molded component 38 serving as a vibration damping device unit incorporating the inner shaft member 12 and the metal sleeve 28.

In the main rubber elastic body 16, a circular recessed portion 40 constituting a pocket portion of large-diameter conical shape opening downward is formed in the center of the axial lower face, and recess portions 42 constituting pocket portions which open onto the outside peripheral face are formed in the axially medial section to either side of the inner shaft member 12. This pair of recess portions 42, 42 are respectively formed with circumferential length approximately equal to just less than one-half the circumference and have flared contours of gradually larger opening width in the axial direction toward the open end. They are positioned opening to the outside peripheral face through the pair of window portions 36, 36 formed in the metal sleeve 28. A pair of linking portions 44, 44 which elastically link the inner shaft member 12 and the metal sleeve 28 are present in the direction orthogonal to the direction of opposition of the pair of recess portions 42, 42. Each of the pair of recess portions 42, 42 is eccentric by a prescribed extent axially upward from the axial center section of the main rubber elastic body 16, so that the axial lower wall section of each recessed portion 42 is thicker than its axial upper wall section.

Meanwhile, as illustrated by the single component in FIGS. 3 to 6, the outer tubular member 14 of the present embodiment has a large-diameter generally round tubular shape with a bottom wall 46 and a peripheral wall 48. In the present embodiment in particular, a large-diameter through-hole 50 is formed in the center section of the bottom wall 46, and a retainer tube portion 52 which projects axially downward is integrally formed at the rim of the large-diameter through-hole 50.

Figure 7:
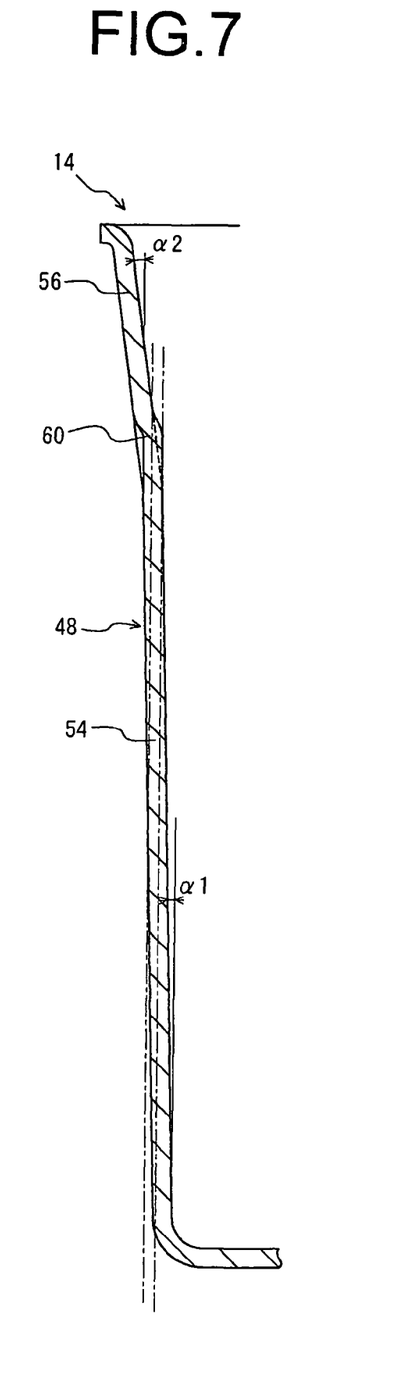
FIG. 7 is an enlarged view in cross section of a mating projection of the outer tubular mounting member of FIG. 3.

Accordingly, in the present embodiment, the peripheral wall 48 is constituted as a tapered tube portion which gradually increases in diameter towards the opening from the bottom wall 46 side over its entire length in the axial direction. In the present embodiment in particular, the peripheral wall 48 is composed of a first tapered section 54 situated towards the bottom wall 46 side, and a second tapered section 56 having a larger taper angle than the first tapered section 54 and connecting at its small-diameter end to the large-diameter end of the first tapered section 54. Specifically, in the present embodiment, as shown in FIG. 7, the peripheral wall 48 constituting the tapered tube portion is composed of a plurality of tapered sections with different taper angles (the first tapered section 54 with a taper angle of α1, and the second tapered section 56 with a taper angle of α2, where α2>α1), with the second tapered section 56 which makes up the opening section on the large-diameter end constituting the large-taper section.

Mating projections 60 which project diametrically inward are formed on the inside peripheral face 58 of the peripheral wall 48 of the outer tubular member 14. In the present embodiment in particular, a pair of mating projections 60 are formed at opposed locations in the diametrical direction to either side of the center axis of the outer tubular member 14.

The axial direction formation location of the mating projections 60 on the outer tubular member 14 is an axial direction location at which the inside diameter dimension of the peripheral wall 48 is greater than the outside diameter dimension at its small-diameter end, i.e. than the minimum outside diameter dimension of the peripheral wall 48. By forming the mating projections 60 at this location in the axial direction, it is possible to prevent another outer tubular member 14 from becoming lodged in the large-diameter opening of the peripheral wall 48. As shown in FIG. 7, the mating projections 60 of the present embodiment are formed at the small-diameter end of the second tapered section 56.

The projecting height of the mating projections 60, seen in a projection of the outer tubular member 14 in the axial direction, is of a size such that their distal ends are situated diametrically inward from the outside edge of the opening at the small-diameter end of the peripheral wall 48. By forming the mating projections 60 with such projecting height, it is possible to prevent another outer tubular member 14 from becoming lodged in the large-diameter opening of the peripheral wall 48. As shown in FIG. 7, the mating projections 60 in the present embodiment are formed with projecting height such that, seen in projection of the outer tubular member 14 in the axial direction, their distal ends are situated diametrically inward to a slight extent beyond the outside edge of the opening at the small-diameter end of the peripheral wall 48.

The basic shape of the outer tubular member 14 is advantageously composed of a press fitting produced by subjecting a flat plate to press working such as deep drawing or punching; followed by press working such as a bending process to constrain the outside peripheral face of the peripheral wall 48 and form the mating projections 60.

Figure 8:
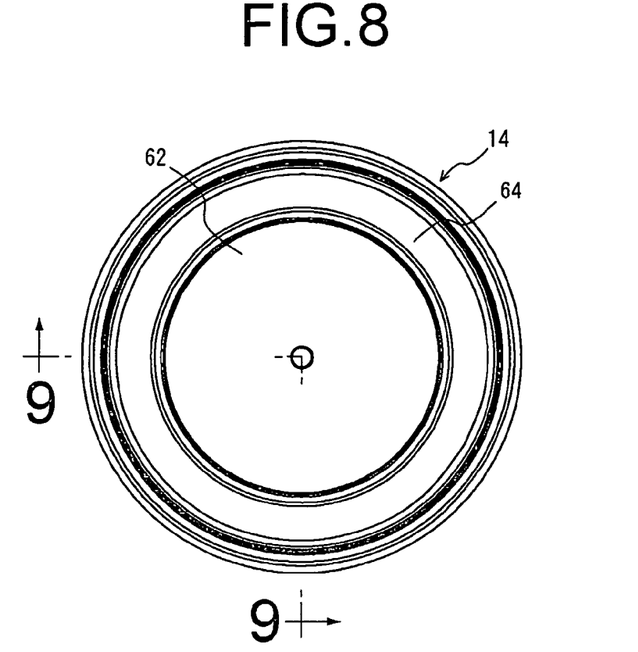
FIG. 8 is a top plane view of the outer tubular mounting member to which a sealing rubber layer and a diaphragm are bonded.
Figure 9:
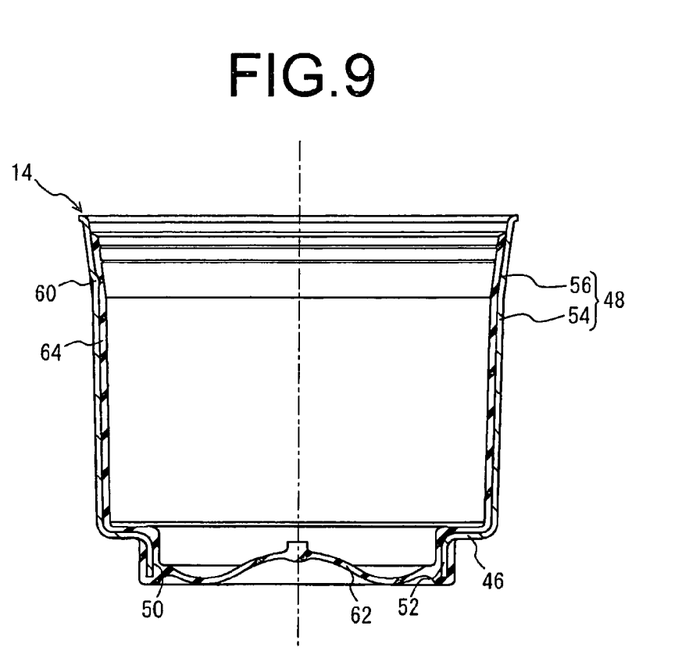
FIG. 9 is a cross sectional view taken along line 9-9 of FIG. 8.

As shown in FIGS. 8 and 9, the outer tubular member 14 described above has a diaphragm 62 formed of a thin rubber film as the flexible film, disposed in the large-diameter through-hole 50 which has been formed in the bottom wall 46. The diaphragm 62 is vulcanization bonded at its outside peripheral edge portion to the retainer tube portion 52, and the large-diameter through-hole 50 formed in the bottom wall 46 of the outer tubular member 14 is thereby sealed off fluid tightly by the diaphragm 62. The diaphragm 62 is installed with a certain amount of slack allowing for easy deformation.

Figure 10:
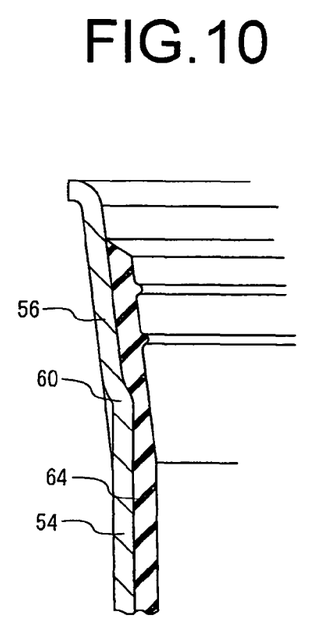
FIG. 10 is an enlarged view in cross section of the mating projection coated by the sealing rubber layer.

Additionally, the inside peripheral face 58 of the peripheral wall 48 is covered by a thin seal rubber layer 64 having a thickness dimension greater than the projecting height of the mating projections 60, so that the mating projections 60 are covered by the seal rubber layer 64. The seal rubber layer 64 of the present embodiment is integrally formed with the diaphragm 62.

The outer tubular member 14 is externally fitted from one axial end thereof onto the outside of the integrally vulcanization molded component 38 of the main rubber elastic body 16. With this one axial end, namely, the second tapered section 56, positioned diametrically outside the large-diameter section 34 of the metal sleeve 28, is subjected to diameter reduction process by 360 degree radial compression or other process thereby securely fastening it to the large-diameter section 34. In the present embodiment in particular, the peripheral wall 48 of the outer tubular member 14 has straight, round tubular contours when externally fitted onto the large-diameter section 34 of the metal sleeve 28. It should be noted that the first and second tapered sections 54, 56 provides an externally fitted section of the outer tubular member 14.

In the present embodiment, with the outer tubular member 14 externally fitted onto the large-diameter section 34 of the metal sleeve 28 in this way, the mating projections 60 formed on the outer tubular member 14 will be situated at the opening sections of the recess portions 42.

By externally fitting the outer tubular member 14 onto the metal sleeve 28 as described above, the inner shaft member 12 will be arranged so as to intrude into the opening of the outer tubular member 14, whereby the inner shaft member 12 and the outer tubular member 14 will be positioned coaxially.

Also, with the outer tubular member 14 externally fitted onto the metal sleeve 28 in the above manner, the axial lower end face of the metal sleeve 28 will be positioned in abutment against the bottom wall of the outer tubular member 14 thereby positioning the metal sleeve 28 in the axial direction with respect to the outer tubular member 14. The seal rubber layer 64 is interposed in a compressed state between the securely fitted faces of the metal sleeve 28 and the outer tubular member 14, i.e., at a section where the metal sleeve 28 and the outer tubular member 14 are fastened together.

Furthermore, by externally fitting the outer tubular member 14 onto the metal sleeve 28 as described above, the large-diameter opening of the outer tubular member 14 will be sealed off fluid tightly by the main rubber elastic body 16, thereby forming a fluid chamber 66 constituting fluid chamber situated between the opposed faces of the main rubber elastic body 16 and the diaphragm 62 in the bottom section of the outer tubular member 14, and filled with a non-compressible fluid. As the sealed fluid it would be possible to use, for example, water, alkylene glycols, polyalkylene glycols, silicone oil, or any mixture of these; in terms of effectively achieving vibration damping action on the basis of the resonance effect of the fluid through a communicating flow passage 84, discussed later, it is preferable to employ a low-viscosity fluid having viscosity of 0.1 Pa·s or lower.

A partition member 68 having generally disk shape overall is disposed extending the axis-perpendicular direction through the fluid chamber 66. This partition member 68 is formed by juxtaposing a thin disk-shaped cover fitting 72 against the upper face of a thick disk-shaped partition fitting 70. The outside peripheral edges of the partition fitting 70 and the cover fitting 72 are juxtaposed in a state of intimate contact, and held clamped between the bottom wall 46 of the outer tubular member 14 and the axial end lower face of the outside peripheral edge of the main rubber elastic body 16, whereby the partition member 68 is disposed accommodated between the opposing faces of the diaphragm 62 and the main rubber elastic body 16.

By disposing the partition member 68 between the opposing faces of the diaphragm 62 and the main rubber elastic body 16 in this way, the fluid chamber 66 which has been formed between the opposed faces of the diaphragm 62 and the main rubber elastic body 16 is bifurcated into upper and lower parts by the partition member 68. Thus, to the upper side of the partition member 68, there is formed a primary fluid chamber 74 a portion of whose wall is constituted by the main rubber elastic body 16 and which gives rise to pressure fluctuations on the basis of elastic deformation of the main rubber elastic body 16 when vibration is input; while to the lower side of the partition member 68 there is formed a secondary fluid chamber 76 a portion of whose wall is constituted by the diaphragm 62 and which readily permits changes in volume on the basis of deformation of the diaphragm 62.

In the partition fitting 70, there is formed a groove 78 which opens onto the outside peripheral face and extends in the circumferential direction for a length approximately equal to three-fourths the circumference. The opening of this groove 78 is sealed off fluid tightly by the outer tubular member 14. As a result, there is formed the communicating flow passage 84 which extends in the circumferential direction through the outside peripheral portion of the partition member 68, and one circumferential end of which connects to the primary fluid chamber 74 through a communication opening 80 while the other circumferential end connects to the secondary fluid chamber 76 through a communication opening 82, thereby permitting fluid flow between the primary fluid chamber 74 and the secondary fluid chamber 76 through the communicating flow passage 84. In the present embodiment, the passage length and passage cross sectional area of the communicating flow passage 84 are adjusted so that high attenuating effect against vibration in a low-frequency range corresponding to engine shake will be exhibited on the basis of the resonance effect of fluid induced to flow through the communicating flow passage 84.

Furthermore, a circular center recess 86 which opens upward is formed in the center section of the partition fitting 70, and the opening of this center recess 86 is covered by the cover fitting 72. A movable rubber plate 88 having disk shape of prescribed thickness is positioned housed within this center recess 86. An annular support portion 90 thicker than the center section is formed at the outside peripheral edge of this movable rubber plate 88, and the annular support portion 90 is held clamped between the partition fitting 70 and the cover fitting 72. The movable rubber plate 88 is thereby positioned within the center recess 86 in state allowing its center section to undergo a prescribed amount of elastic deformation in the axial direction.

A plurality of through-holes 92 are provided in both the upper and lower wall portions of the center recess 86 which are formed by the partition fitting 70 and the cover fitting 72. Via these through-holes 92, fluid pressure within the primary fluid chamber 74 and the secondary fluid chamber 76 is exerted on the upper face and the lower face of the movable rubber plate 88 installed within the center recess 86. Then, through elastic deformation of the movable rubber plate 88 on the basis of the differential between the fluid pressure of the primary fluid chamber 74 exerted on the upper face of the movable rubber plate 88 and the fluid pressure of the secondary fluid chamber 76 exerted on the lower face of the movable rubber plate 88, substantial fluid flow will be created between the primary fluid chamber 74 and the secondary fluid chamber 76 through the center recess 86 and the through-holes 92 respectively formed in the partition fitting 70 and the cover fitting 72, at a level corresponding to the extent of elastic deformation of the movable rubber plate 88, thereby alleviating and absorbing pressure fluctuations in the primary fluid chamber 74.

In the present embodiment in particular, when high-frequency, small-amplitude vibration such as booming or muffled noise is input, the resultant pressure fluctuations of the primary fluid chamber 74 can be advantageously absorbed or ameliorated on the basis of elastic deformation of the movable rubber plate 88; whereas when low-frequency, large-amplitude vibration such as engine shake is input, the extent of elastic deformation of the movable rubber plate 88 will be restricted through contact of the movable rubber plate 88 against the inside face of the center recess 86, thereby giving rise to effective pressure fluctuations in the primary fluid chamber 74.

Furthermore, since the outer tubular member 14 is externally fitted onto the metal sleeve 28, the window portions 36, 36 of the metal sleeve 28 are covered fluid tightly by the outer tubular member 14, whereby the openings of the pair of recess portions 42, 42 are covered by the outer tubular member 14 and form a pair of working fluid chambers 94 constituting fluid chambers filled with non-compressible fluid, situated at opposed locations along an axis lying in the diametrical direction. This pair of working fluid chambers 94 are filled with a non-compressible fluid similar to the non-compressible fluid filling the fluid chamber 66.

A tubular orifice member 96 is positioned between the opposed faces of the outer tubular member 14 and the metal sleeve 28 lying in the axis-perpendicular direction. This tubular orifice member 96 has a generally tubular shape with circumferential length equal to at least one-half the circumference (in the present embodiment, circumferential length approximately equal to three-fourth of the circumference), and is fabricated of a hard material such as synthetic resin or metal. The inside diameter dimension of the tubular orifice member 96 is slightly larger than the outside diameter dimension of the small-diameter section 32 of the metal sleeve 28, while the outside diameter dimension of the tubular orifice member 96 is approximately equal to the outside diameter dimension of the large-diameter section 34 of the metal sleeve 28. Moreover, the tubular orifice member 96 is attached to the metal sleeve 28 by sliding it onto the outside of the metal sleeve 28 from axially above, starting from the small-diameter section 32. With the tubular orifice member 96 attached to the metal sleeve 28 in this way, the upper end section of the tubular orifice member 96 will extend out into the window portions 36 so as to be positioned in the axially medial section of the window portion 36. Meanwhile, the lower end section of the tubular orifice member 96 will be positioned abutting against the bottom wall 46 of the outer tubular member 14, and held clamped about its entire circumference between the rim of the opening of the small-diameter section of the metal sleeve 28 and the peripheral wall 48 of the outer tubular member 14.

Furthermore, a groove 98 which extends in the circumferential direction and which opens onto the outside peripheral face is formed in the tubular orifice member 96. This groove 98 connects at one end to one of the working fluid chambers 94 via a passage hole 100 passing through the bottom wall section of the groove 98, while the other end of the groove 98 in the circumferential direction connects to the other working fluid chamber 94 via a passage hole 102 passing through the bottom wall section of the groove 98. This groove 98 is covered fluid tightly by the peripheral wall 48 of the outer tubular member 14, thereby forming an orifice passage 104 which interconnects the pair of working fluid chambers 94 and which extends along the inside peripheral face 58 of the peripheral wall 48 of the outer tubular member 14. In the present embodiment, the passage length and passage cross sectional area of the orifice passage 104 are adjusted so that high attenuating effect against low-frequency vibration such as engine shake will be exhibited on the basis of the resonance effect of fluid induced to flow through the orifice passage 104 between the pair of working fluid chambers 94, 94.

In the present embodiment, when the tubular orifice member 96 is externally fitted onto the outside of the metal sleeve 28, the metal sleeve 28 is subjected to a preliminary diameter reduction process such as 360 degree radial compression, thereby applying pre-compression to the main rubber elastic body 16. As a result, during vulcanization molding of the main rubber elastic body 16, it will be possible to ameliorate or eliminate tensile stress arising in the main rubber elastic body 16, and to improve the load bearing capability and durability of the main rubber elastic body 16.

A tubular mounting bracket, not shown, is externally fitted onto the peripheral wall 48 of the outer tubular member 14 of the engine mount 10 having the structure discussed above. The engine mount 10 with the attached tubular mounting bracket is then installed with the mounting fastener portion 20 of the inner shaft member 12 fastened to the power unit, not shown, by a bolt (not shown) which is passed through a mounting hole 106 formed in the mounting fastener portion 20, while the outer tubular member 14 is fastened to the body of the automobile via a mounting bracket, thereby providing the power unit with vibration-damped support on the body. In the present embodiment, the engine mount 10 is installed on the vehicle with the diametrical direction of opposition of the pair of working fluid chambers 94, 94 approximately aligned with the front-back direction of the vehicle.

With the engine mount 10 installed on the vehicle in the above manner, when vibration is input across the inner shaft member 12 and the outer tubular member 14 in the generally vertical direction, a relative pressure differential will arise between the primary fluid chamber 74 and the secondary fluid chamber 76. Accordingly, where the vibration input in the generally vertical direction across the inner shaft member 12 and the outer tubular member 14 is low-frequency, large-amplitude vibration such as engine shake, high attenuating effect will be produced on the basis of the resonance effect of fluid induced to flow through the communicating flow passage 84. Alternatively, where the vibration input in the generally vertical direction across the inner shaft member 12 and the outer tubular member 14 is high-frequency, small-amplitude vibration such as booming noise, pressure fluctuations in the primary fluid chamber 74 will be absorbed or ameliorated on the basis of elastic deformation of the movable rubber plate 88, producing vibration isolating effect on the basis of low spring action.

Meanwhile, with the engine mount 10 installed on the vehicle in the above manner, when vibration is input across the inner shaft member 12 and the outer tubular member 14 in the generally horizontal direction (approximately front-back direction of the vehicle), a pressure differential will arise between the pair of working fluid chambers 94, 94. Accordingly, where the vibration input across the inner shaft member 12 and the outer tubular member 14 in the generally horizontal direction (approximately front-back direction of the vehicle), is low-frequency, large-amplitude vibration such as engine shake, high attenuating effect will be produced on the basis of the resonance effect of fluid induced to flow through the orifice passage 104.

The method of manufacturing the engine mount 10 having the structure described above will now be discussed. First, a flat plate is subjected to press working such as deep drawing or punching to produce the basic shape of the outer tubular member 14, i.e., a shape which includes the peripheral wall 48, the bottom wall 46, and the retainer tube portion 52. Then, force is applied from outside in diametrical direction against the small-diameter end of the second tapered section 56 of the peripheral wall 48 of the outer tubular member 14 to induce sections situated in opposition along an axis lying the diametrical direction at the small-diameter end of the second tapered section 56 to project diametrically inward and form the mating projections 60, 60, giving the outer tubular member 14 having the desired shape.

A number of cuter tubular members 14 produced in this way are gathered into a single basket, and these outer tubular members 14 are subjected simultaneously to pre-treatment for form the seal rubber layer 64 covering the inside peripheral face 58.

Figure 11:
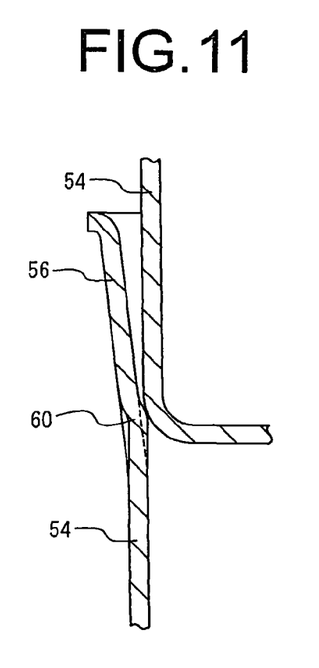
FIG. 11 is a view suitable for explaining a state where the mating projection of one outer tubular mounting member is brought into contact with the small diameter end of another outer tubular mounting member.

In the present embodiment, the pair of mating projections 60, 60 have been formed on the inside peripheral face 58 at the small-diameter end of the second tapered section 56 of the outer tubular member 14, as shown in FIG. 11. Thus, the small-diameter end of another outer tubular member 14 will be prevented from becoming lodged in the large-diameter opening of a first outer tubular member 14 since the small-diameter end of this other outer tubular member 14 will come into contact against the pair of mating projections 60, 60 which have been formed in the second tapered section 56 of the first outer tubular member 14.

The pretreated outer tubular member 14 is then set in a forming mold, and the seal rubber layer 64 is bonded to the inside peripheral face 58 simultaneously with vulcanization molding. The diaphragm 62 is also bonded at its outside peripheral edge to the retainer tube portion 52 simultaneously with vulcanization molding. During this process, the seal rubber layer 64 is larger than the projecting height of the mating projections 60, and thus with the seal rubber layer 64 formed covering the inside peripheral face 58 of the outer tubular member 14, the mating projections 60 will be covered by the seal rubber layer 64.

The outer tubular member 14 with the seal rubber layer 64 and the diaphragm 62 attached as described above is securely fastened onto the integrally vulcanization molded component 38 of the main rubber elastic body 16 to which the tubular orifice member 96 has been attached, so as to be externally assembled thereon from its large-diameter opening end. Then, the outer tubular member 14 is subjected to the diameter reduction process by 360 degree radial compression or the like. This securely fastening operation is carried out within a bath containing the non-compressible fluid to be sealed in the interior, so that sealing of the non-compressible fluid in the interior is accomplished at the same time as securely fastening of the outer tubular member 14 and the metal sleeve 28.

Consequently, in the engine mount 10 having the structure described above, it is possible to reliably carry out pre-treatment for the purpose of forming the seal rubber layer 64 covering the outer tubular member 14. This makes it possible to advantageously avoid the occurrence of bonding defects during bonding of the vulcanization-molded seal rubber layer 64 subsequent to pre-treatment. As a result, it will be possible to carry out pre-treatment of the outer tubular member 14, and hence forming of the seal rubber layer 64 on the outer tubular member 14, with a high level of reliability.

Moreover, since the mating projections 60 are covered by the seal rubber layer 64, it is possible to advantageously avoid the mating projections 60 becoming caught on the metal sleeve 28 when the outer tubular member 14 is externally fitted onto the metal sleeve 28.

In the present embodiment, the outer tubular member 14 is formed by a press fitting, and the mating projections 60 are formed by subjecting the press fitting having the basic shape to press working, whereby it is possible to advantageously manufacture the outer tubular member 14 with the mating projections 60 formed on its inside peripheral face 58.

Moreover, in the present embodiment, the mating projections 60 are formed as a pair which are situated to either side of the center axis of the outer tubular member 14, in opposition on an axis lying the diametrical direction, whereby it is possible to advantageously prevent another outer tubular member 14 from becoming lodged in the large-diameter opening of the peripheral wall 48, while keeping to a minimum the number of mating projections 60 formed on the outer tubular member 14.

Furthermore, in the present embodiment, the peripheral wall 48 is formed with a shape having the first tapered section 54 and the second tapered section 56 of larger taper angle than the first tapered section 54, with the mating projections 60 being formed on the second tapered section 56. This arrangement makes it possible to select the location in the axial direction at which the mating projections 60 will be formed on the outer tubular member 14, and thereby makes it possible to situate the mating projections 60 at the opening sections of the recess portions 42, and situate them at a location away from the tubular orifice member 96. As a result, it is possible to advantageously avoid problems such as diminished fluid tightness of the pair of working fluid chambers 94, 94 caused by the mating projections 60 being situated in the securely fastening section, or damage to the tubular orifice member 96 caused by the mating projections 60 being pushed against the tubular orifice member 96.

In the present embodiment in particular, by forming the mating projections 60 at the small-diameter end of the second tapered section 56, it is possible to minimize the projecting height of the mating projections 60, resulting in minimizing the thickness dimension of the seal rubber layer 64.

Moreover, in the present embodiment, with the outer tubular member 14 externally fitted onto the metal sleeve 28, the peripheral wall 48 of the outer tubular member 14 has a straight, round tubular shape. This makes it possible to advantageously ensure good holding force when the peripheral wall 48 of the outer tubular member 14 is securely fastened onto the tubular bracket (i.e. force preventing the outer tubular member 14 from becoming dislodged from the tubular bracket), along the entire length of the peripheral wall 48 in the axial direction.

Furthermore, in the present embodiment, since the mating projections 60 are formed on the inside peripheral face 58 of the outer tubular member 14, it is possible to advantageously achieve fitting of the peripheral wall 48 of the outer tubular member 14 into the tubular bracket.

While the present invention has been described in detail in its presently preferred embodiment, for illustrative purpose only, it is to be understood that the invention is by no means limited to the details of the illustrated embodiment, but may be otherwise embodied.

For example, in the illustrated embodiment, the present invention was implemented in a fluid filled vibration damping device in which the fluid chambers are formed by having the outer mounting member cover pocket portions which open respectively onto the outside peripheral face and the axial upper end face of the main rubber elastic body. It would also be possible to implement the invention in the fluid filled vibration damping device disclosed in JP-B-8-6777. Specifically, in the fluid filled vibration damping device disclosed in JP-B-8-6777, after inserting the linking fitting of an integrally vulcanization molded component into the collar portion of a mounting member, the collar portion of the mounting member is subjected to a diameter reduction process such as 360 degree radial compression to fasten the collar portion of the mounting member about the linking fitting of the integrally vulcanization molded component, thereby imparting to the collar portion of the mounting member an outward taper which flares axially outward. Also, by fastening the collar portion of the mounting member about the linking fitting of the integrally vulcanization molded component, a pressure-receiving chamber and an equilibrium chamber filled with non-compressible fluid are formed, whereby with the inside peripheral face of the collar portion of the mounting member covered by a seal rubber layer, the seal rubber layer will be positioned in a compressed state between the collar portion of the mounting member and the linking fitting of the integrally vulcanization molded component. Consequently, in a fluid filled vibration damping device having this sort of structure as well, where the pre-treatment for the purpose of covering the inside peripheral face of the collar portion of the mounting member with the seal rubber layer is carried out simultaneously on multiple mounting members, it is possible for mounting members to become lodged in one another, resulting in untreated sections of the mounting members. However, through implementation of the present invention, it will be possible to reliably carry out pre-treatment of the mounting members.

The present invention is of course applicable as well to fluid filled vibration damping devices of so-called bushing type disclosed inter alia in JP 2000-120761.

Furthermore, with the outer mounting member fastened onto the collar sleeve, the tapered tube portion need not be a straight, round circular shape, but may instead remain a tapered tube portion having a taper angle.

Moreover, the collar sleeve may be constituted by a pair of ring fitting spaced apart in the axial direction. In this case, a window portion will be constituted by the gap lying the axial direction between the pair of ring fittings.

It is also to be understood that the present invention may be embodied with various other changes, modifications and improvements, which may occur to those skilled in the art, without departing from the spirit and scope of the invention defined in the following claims.

What is claimed is:
1. A fluid filled type vibration damping device comprising:
an inner mounting member fixable to one of components to be linked in vibration damping fashion;
a main rubber elastic body bonded to the inner mounting member;
a collar sleeve bonded onto an outside peripheral face of the main rubber elastic body;
an outer tubular mounting member attached to another of the components to be linked in vibration damping fashion, the outer tubular mounting member being externally fitted onto the collar sleeve so that an opening of at least one pocket portion provided to the main rubber elastic body is fluid-tightly covered by the outer tubular mounting member so as to form a fluid chamber filled with a non-compressible fluid; and a seal rubber layer bonded to an inside peripheral face of the outer tubular mounting member and compressed between the outer tubular mounting member and the collar sleeve;

wherein an externally fitted section of the outer tubular mounting member to the collar sleeve is formed by a tapered tube portion of the outer tubular mounting member, the tapered tube portion being assembled externally from a large-diameter opening thereof onto the collar sleeve and fastened thereto by means of diameter reduction process;

at least one mating projection which projects diametrically inward is formed on an inside peripheral face of the tapered tube portion of the outer tubular mounting member, while the seal rubber layer having a thickness greater than a projecting height of the mating projection is formed covering the inside peripheral face of the outer tubular mounting member with the mating projection covered by the seal rubber layer;

a location and projecting height of the mating projection are arranged so as to prevent an entry of another outer tubular mounting member into the large-diameter opening of the tapered tube portion during a pre-treatment executed before the seal rubber layer has been formed and before the outer tubular mounting member being fastened onto the collar sleeve; and the mating projection is formed at a location situated at the opening of the pocket portion in the outer tubular mounting member, and covering the pocket portion.

2. The fluid filled type vibration damping device according to claim 1, wherein the outer tubular mounting member is formed by pressing, and the mating projection is formed by pressing on the tapered tube portion.

3. The fluid filled type vibration damping device according to claim 1, wherein the at least one mating projection comprises a plurality of mating projections, and the mating projections are formed at locations opposed diametrically to each other on either side of a center axis of the outer tubular mounting member.

4. The fluid filled type vibration damping device according to claim 1, wherein the tapered tube portion comprises multiple tapered sections of different taper angles, and a section located at the large-diameter opening constitutes a large-taper section endowed with a greatest taper angle, while the mating projection is formed in the large-taper section.

5. The fluid filled type vibration damping device according to claim 4, wherein the mating projection is situated at a small-diameter end of the large-taper section.

6. The fluid filled type vibration damping device according to claim 1, wherein the tapered tube portion of the outer tubular mounting member has a straight, round tubular shape with the outer tubular mounting member securely fitted onto the collar sleeve.

7. The fluid filled type vibration damping device according to claim 1, wherein the collar sleeve is disposed radially outward of the inner mounting member with a given distance disposed therebetween in an axis perpendicular direction, with the collar sleeve and the inner mounting member connected in the axis-perpendicular direction by the main rubber elastic body;

wherein the at least one pocket portion comprises a pair of pocket portions situated in opposition in the axis-perpendicular direction and opening onto the outside peripheral face of the main rubber elastic body, while the collar sleeve has a pair of window portions located at either side of the inner mounting member in the axis-perpendicular direction so that pocket portions open onto the outside peripheral face through the respective window portions of the collar sleeve; and wherein the outer tubular mounting member is assembled externally onto the collar sleeve, and then is fastened onto the collar sleeve through a diameter reduction process so that the window portions of the collar sleeve are covered fluid tightly by the outer tubular mounting member, providing a pair of fluid chambers situated in opposition to either side of the inner mounting member in the axis-perpendicular direction.

8. A method of manufacturing a fluid filled type vibration damping device having a non-compressible fluid sealed therein, comprising the steps of:

preparing a vibration damping device unit including an inner mounting member bonded to a center section of a main rubber elastic body, a collar sleeve bonded to an outside peripheral face of the main rubber elastic body, and at least one pocket portion which open onto an outside peripheral face of the collar sleeve;

preparing an outer tubular mounting member so as to have an externally fitted section adapted to be fastened to the collar sleeve and having a tapered tube portion with a taper angle, and so as to have a mating projection which projects diametrically inward on an inside peripheral face of the outer tubular mounting member and is formed at a location adapted to be situated at an opening of the pocket portion in the outer tubular mounting member, and covering the pocket portion, the outer tubular mounting member being subjected to a pre-treatment for forming a seal rubber layer thereon, which is performed simultaneously on a plurality of outer tubular mounting members destined for respective installation in separate fluid filled type vibration damping devices such that the mating projection prevents a small-diameter end portion of an outer tubular mounting member from becoming lodged in a large-diameter opening of another outer tubular mounting member;

coating an inside peripheral face of the outer tubular mounting member by the seal rubber layer so as to be bonded thereto, the seal rubber layer having thickness greater than a projecting height of the mating projection so that the mating projection is covered by the seal rubber layer;

externally assembling the outer tubular mounting member onto the vibration damping device unit such that the tapered tube portion of the outer tubular mounting member being assembled from a large-diameter end thereof onto the collar sleeve and subjected to a diameter reduction process to thereby being fastened onto the collar sleeve so that the opening of the pocket portion is covered by the outer tubular mounting member; and fluid-tightly sealing an interface between the outer tubular mounting member and the collar sleeve by the seal rubber layer which covers the inside peripheral face of the outer tubular mounting member so that the seal rubber layer is compressed between the outer tubular mounting member and the collar sleeve.

* * * * *